I. L. G. Rice.
Inking Apparatus.
N⁰ 104,203. Patented Jun. 14, 1870.

Witnesses
St. Clair Drung
John G. Stewat

Inventor
Israel L. G. Rice

United States Patent Office.

ISRAEL L. G. RICE, OF CAMBRIDGE, MASSACHUSETTS.

Letters Patent No. 104,203, dated June 14, 1870.

IMPROVEMENT IN INKING-APPARATUS FOR PRINTING-PRESSES.

The Schedule referred to in these Letters Patent and making part of the same.

I, ISRAEL L. G. RICE, of the city of Cambridge, county of Middlesex and State of Massachusetts, have invented an Improved Apparatus for Distributing Printing-Inks of Various Colors on Lines of Printing-Types, so that several colors may be printed by one form at one impression.

Nature and Object of the Invention.

The object of the invention is an improvement over an apparatus for the same purpose for which a patent was granted to me April 20, 1869.

The patent referred to was granted for "the application of distributing-disks placed at right angles with distributing-rollers, or inking-rollers, or inking-tables, substantially as and for the purposes set forth."

The first part of my invention relates to securing a more convenient mode of operating and adjusting the disks.

The second part of my invention relates to the use of endless belts or aprons placed over the upper and lower rollers and against a roller between them, so that they are held in place against the disks upon which the inks are distributed by the disks.

Description of the Accompanying Drawing.

Figure 1:
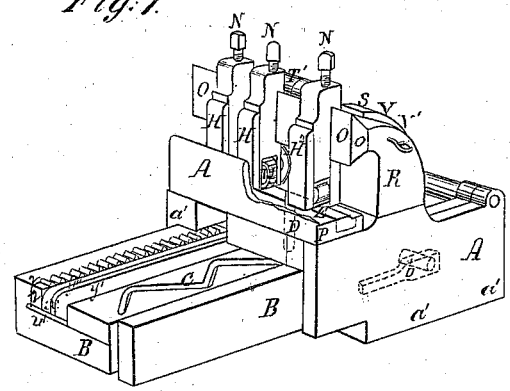
Figure 1 is a perspective view of the machine, embodying my invention.
Figure 2:
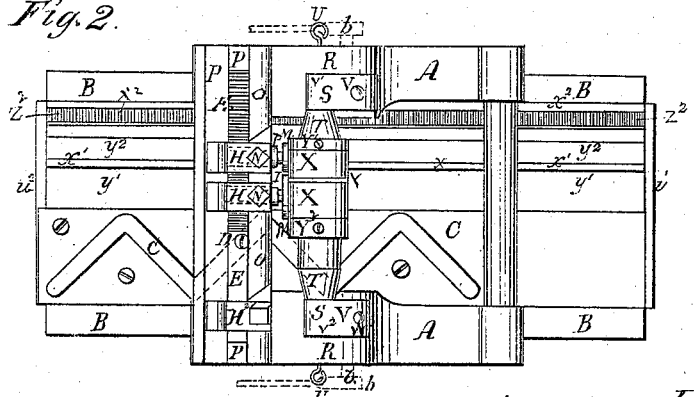
Figure 2 is a plan of the same.
Figures 3, 4:
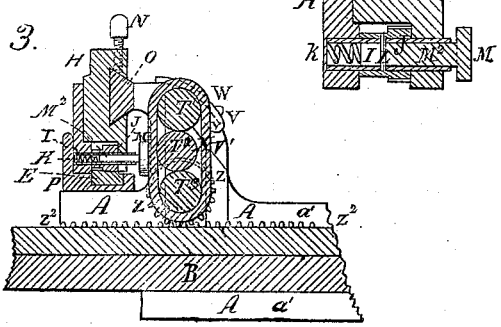
Figure 3 is a sectional elevation.
Figure 4 is a sectional view of a spindle with a gear upon it, a spring inside of the spindle, and the stem of a disk placed inside the spindle against the spring.

General Description.

The rotating disk upon which the ink is distributed on a Gordon press is removed, and the frame B secured in any suitable way in its place. This may be done by boring through the bottom of the frame, and putting two bolts through it into the two holes through which bolts are now placed to hold an iron bearing, which supports the rotating disk that belongs to the press.

The carriage A is then put upon the frame, with suitable bearings, $a'$ $a'$, on each side.

Two connecting-rods are then fastened to it, one on each side, shown at $b'$ $b'$. The other ends of the rods are connected to that part of the press directly behind the platen. This may be done by an upright stand bolted onto the frame of the press behind the platen, one on each side for each rod.

C is a cam, in which moves a pin, D, connected with the rack E.

H is a movable stand, provided with a spindle, I, and gear upon it, J. This spindle is bored into, and in it is placed a spring, K, and a pin, L.

M is a disk with a long stem, $M^2$. In the middle of the stem is a slot. The stem is pushed into the spindle, which is hollow, care being taken to have the pin fit into the slot. The spring in the spindle presses the disk against the distributing-belt.

N is a screw to fasten the stand in any place upon the bar O.

P is a part of the carriage, which has the double object of connecting the two sides together and also furnishing a bearing for the rack to run in.

$H^2$ is a stand with a roller in it, which is placed upon the rack to keep that end of it from springing any as it is worked.

The two stands R R on the carriage are receptacles for the bearings S S of the rollers $T^1$ $T^2$ $T^3$.

U U are pins to hold the bearings in their proper positions.

V V are caps or half boxes that go over the ends of the roller $T^1$. Their object is this: when the distributing-belts are to be put upon the rollers, the caps are removed, one of the bearings on the side of the rollers taken out, and the belts slipped on in their places. The bearing is then put back on the rollers; then the top roller $T^1$ is forced into the half boxes $v^1$ $v^2$, and the caps V V put on them, and held in place by the pins or screws W W.

X X are belts, made of leather, upon which the ink is distributed.

Y is a washer, placed on the rollers $T^1$ $T^2$ to separate the two belts.

$Y^1$ and $Y^2$ are two washers, with set-screws, to hold the belts in place. These washers are slipped upon the upper and lower rolls $T^1$ and $T^3$.

Z is a gear upon the roller $T^3$, which is moved by the rack $z^2$.

$y^1$ $y^2$ are ink-tables to distribute the ink upon. These I make of wood or metal, and place a small round spring on their bottom, so they press firmly and squarely against the distributing-belts.

$x^1$ $x^2$ are spaces of wood, a little less in height than the ink-tables. Their object is to separate the tables from one another.

$w^1$ $w^2$ are strips of metal placed at each end of the frame B, to prevent the ink-tables from moving out of place.

Having given a description of the various parts, I will now describe their operation.

The form having been furnished to the pressman to be printed, he selects ink-tables of a width larger than the lines of types to be printed. He then arranges them in their proper positions, placing a wooden space between each one. He decides upon where to put them by consulting the form. He places his tables in a direct line with the types to be printed from. He then takes an equal number of movable stands H H that he has ink-tables, and slides them along upon the bar O, fitting the gear J into the rack E, and securing the stand in its proper position, that is, its center over the center of the ink-table, by means of the screw N. A disk about the same diameter as the table is in width, is then put on the spindle I, the face of the disk pressing against the belts when they are put on. The belts are then put on, with the washers betwen.

By the mechanism of the Gordon press a reciprocating motion is given to the frame B, which causes the gear on the roller $T^3$ to revolve, which keeps the belts turning around, and, as the press works, the cam C is made to have a reciprocating motion, as it is fastened to the frame B. This gives a reciprocating motion to the rack E. This causes the disks to revolve continually, first in one direction, and then in an opposite one. This distributes the ink.

With this apparatus fountains are used, for which a patent was allowed me.

These belts come in contact with the fountains, and take a little ink at each impression.

This apparatus may be applied to any press other than the Gordon, by altering it to suit the peculiar formation of the press upon which it is to be placed.

Claims.

What I claim as my invention, and desire to secure by Letters Patent, is—

1. The cam C, the rack E, and pin D, and the movable stands H H, with their spindles I and gears J, when combined together substantially in the manner and for the purposes herein set forth.

2. The belts or aprons X X, the rollers $T^1$ $T^2$ $T^3$, the washers $y^1$ $y^2$, when combined together substantially as, in the manner, and for the purposes herein set forth.

ISRAEL L. G. RICE.

Witnesses:
SAMUEL B. MCEUD,
JAMES R. PENDLEBURY.